(12) United States Patent
Hin et al.

(10) Patent No.: US 7,211,176 B2
(45) Date of Patent: May 1, 2007

(54) REPLACEABLE CHLORINATOR ELECTRODE ASSEMBLY

(75) Inventors: Raymond Albert Hin, Lilydale (AU); Peter Baden Farrer, Blackburn (AU); Gary Andrew Kennedy, Croydon (AU); Richard T. Coffey, Pompano Beach, FL (US)

(73) Assignee: Zodiac Pool Care, Inc., Vista, CA (US)

( * ) Notice: Subject to any disclaimer, the term of this patent is extended or adjusted under 35 U.S.C. 154(b) by 374 days.

(21) Appl. No.: 10/979,488

(22) Filed: Nov. 2, 2004

(65) Prior Publication Data

US 2006/0091002 A1 May 4, 2006

(51) Int. Cl.
*C25B 9/00* (2006.01)

(52) U.S. Cl. .................. 204/269; 204/275.1; 204/278.5

(58) Field of Classification Search ................ 204/269, 204/275.1, 278.5
See application file for complete search history.

(56) References Cited

U.S. PATENT DOCUMENTS

| | | | |
|---|---|---|---|
| D130,069 S | 10/1941 | Harper | |
| 4,085,028 A | 4/1978 | McCallum | |
| 4,263,114 A | 4/1981 | Shindell | |
| 4,328,084 A | 5/1982 | Shindell | |
| 4,364,814 A | 12/1982 | Langley | |
| 4,451,341 A | 5/1984 | Miller | |
| 4,680,114 A | 7/1987 | Hayes | |
| 4,781,805 A | 11/1988 | Dahlgren | |
| 4,808,290 A | 2/1989 | Hilbig | |
| 4,834,858 A | 5/1989 | Barber | |
| 4,936,979 A | 6/1990 | Brown | |
| D309,493 S | 7/1990 | Casberg | |
| 4,992,156 A | 2/1991 | Silveri | |

5,076,315 A 12/1991 King (Continued)

FOREIGN PATENT DOCUMENTS

AU 718005 7/2000

(Continued)

OTHER PUBLICATIONS

Patent Abstracts of Japan, vol. 2002, No. 2, Apr. 2, 2002 and JP 2001 276828 A (Miyazaki, Tomoyoshi, Miyazaki Akiko) Oct. 9, 2001 Abstract.

(Continued)

*Primary Examiner*—Arun S. Phasge
(74) *Attorney, Agent, or Firm*—Kilpatrick Stockton LLP

(57) ABSTRACT

The invention relates to an apparatus for electrolytic purification, comprising:
(a) a pressure vessel having at least one access opening, at least one fluid flow inlet, and at least one fluid flow outlet, wherein the fluid flow inlet and fluid flow outlet are in fluid communication with a chamber inside the pressure vessel;
(b) an removable electrode assembly, at least a portion of which is disposed within the chamber inside the pressure vessel, comprising:
a plurality of substantially parallel spaced planar electrodes,
an electrical coupling between the electrode plates and a voltage source, and
a radially extending circumferential sealing plate substantially normal to the planes of the electrodes, disposed near the electrical coupling, adapted to prevent fluid flow from the chamber to the electrical coupling;
(c) a removable locking ring, comprising:
a proximal portion adapted to removably attach to the access opening of the pressure vessel and retain the radially extending circumferential sealing plate of the electrode assembly against the pressure vessel access opening.

16 Claims, 5 Drawing Sheets

U.S. PATENT DOCUMENTS

| | | |
|---|---|---|
| D371,824 S | 7/1996 | Price et al. |
| 5,746,923 A | 5/1998 | Forward |
| 5,772,896 A | 6/1998 | Denkewicz, Jr. et al. |
| 5,792,369 A | 8/1998 | Johnson |
| 5,935,609 A | 8/1999 | Denkewicz, Jr. et al. |
| 5,993,669 A | 11/1999 | Fulmer |
| 5,993,753 A | 11/1999 | Davidson |
| 6,039,883 A | 3/2000 | Milde et al. |
| 6,093,422 A | 7/2000 | Senderov |
| 6,132,627 A | 10/2000 | Joko et al. |
| 6,190,547 B1 | 2/2001 | King et al. |
| 6,197,195 B1 | 3/2001 | Booth et al. |
| 6,207,060 B1 | 3/2001 | McKa |
| 6,210,566 B1 | 4/2001 | King |
| 6,221,321 B1 | 4/2001 | Fleischer et al. |
| 6,224,744 B1 | 5/2001 | Casado Gimenez et al. |
| 6,224,779 B1 | 5/2001 | Spector |
| 6,254,788 B1 | 7/2001 | Davidson |
| 6,254,894 B1 | 7/2001 | Denkewicz, Jr. et al. |
| 6,287,450 B1 | 9/2001 | Hradil |
| 6,287,462 B1 | 9/2001 | Likos |
| 6,368,474 B1 | 4/2002 | Wilkins |
| 6,508,929 B1 | 1/2003 | Mercer |
| 6,524,475 B1 | 2/2003 | Herrington et al. |
| 6,551,518 B2 | 4/2003 | Miyazaki et al. |
| D486,881 S | 2/2004 | Pecci et al. |
| 6,761,827 B2 | 7/2004 | Coffey |
| 6,766,203 B2 | 7/2004 | Doan et al. |
| 6,814,095 B2 | 11/2004 | King |
| 6,821,398 B2 * | 11/2004 | Von Broembsen ....... 204/278.5 |
| D506,804 S | 6/2005 | Maloney et al. |
| 6,982,040 B2 | 1/2006 | Costa et al. |
| 2002/0147488 A1 | 10/2002 | Doan et al. |
| 2002/0189954 A1 | 12/2002 | Miyazaki et al. |
| 2003/0119377 A1 | 6/2003 | Hill et al. |
| 2004/0050781 A1 | 3/2004 | Coffey et al. |
| 2004/0194563 A1 | 10/2004 | Milanovic |
| 2005/0039795 A1 | 2/2005 | King |

FOREIGN PATENT DOCUMENTS

| | | |
|---|---|---|
| DE | 36 29 010 A | 3/1988 |
| EP | 0 675 081 A2 | 10/1995 |
| EP | 0 834 472 A2 | 4/1998 |
| GB | 1 310 764 A | 3/1973 |
| GB | 2 348 945 A | 10/2000 |
| WO | WO 97/37939 | 10/1997 |
| WO | WO 99/44949 | 9/1999 |
| WO | WO 03/040038 A2 | 5/2003 |

OTHER PUBLICATIONS

Fifth Edition *Chemical Engineers' Handbook*, Robert H. Perry/Cecil H. Chilton (published by McGraw-Hill Book Company), Section 5 Fluid and Particle Mechanics, pp. 5-10 thru 5-15, (copyright 1973).

* cited by examiner

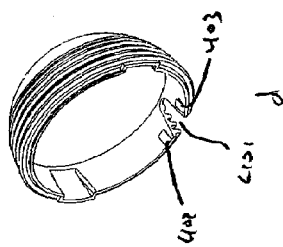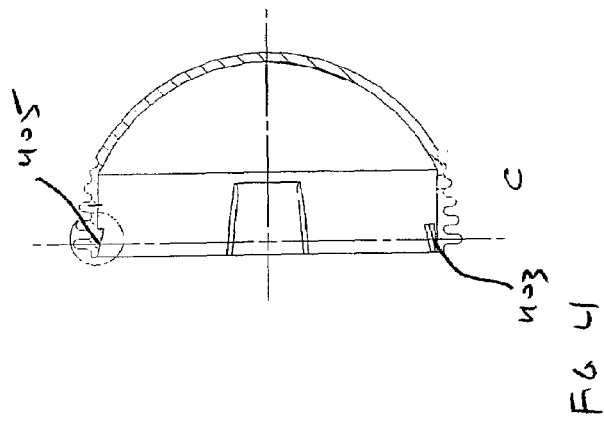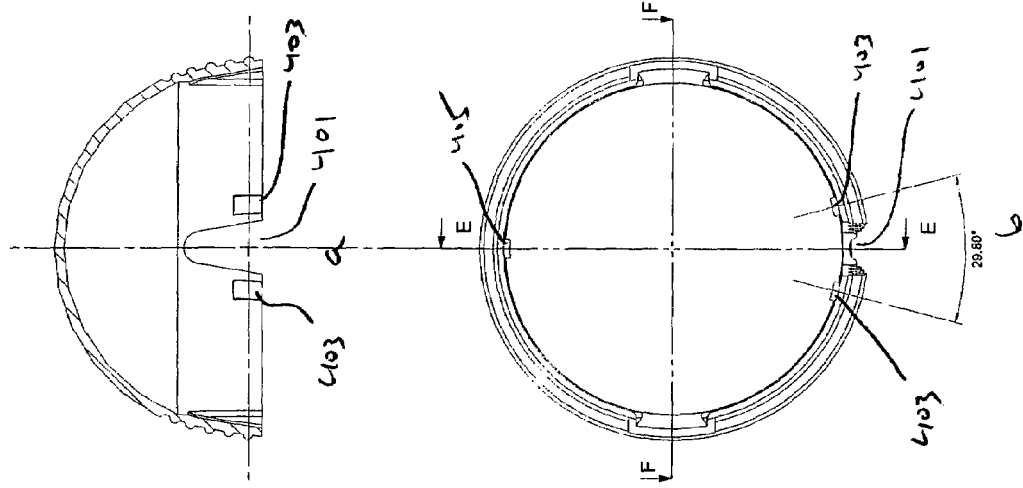
FIG 4

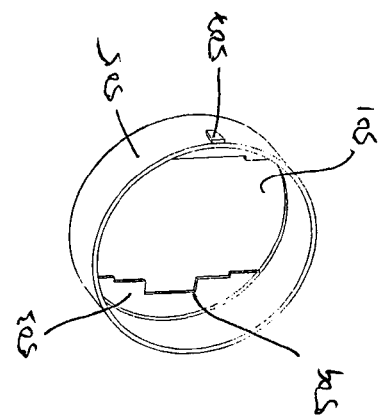
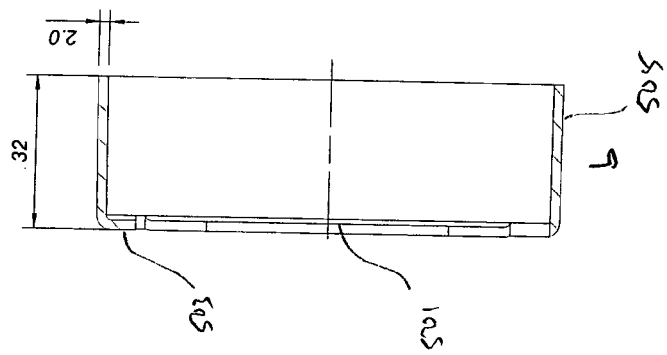
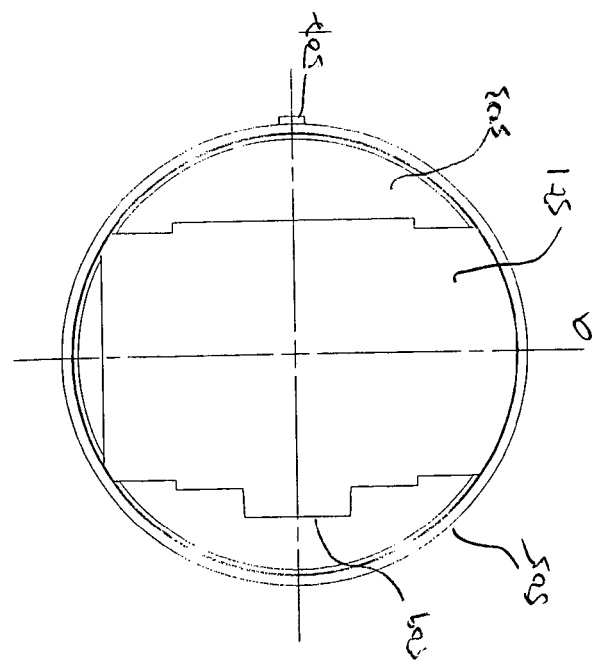
FIG 5

REPLACEABLE CHLORINATOR ELECTRODE ASSEMBLY

BACKGROUND OF THE INVENTION

1. Field of the Invention

The invention relates to an apparatus for purifying water by electrolytic purification, wherein the electrode used to create the electrolytic reaction is easily replaceable.

2. Description of the Related Art

Electrolytic purification of water has been carried out for some time. The process involves the purification of water that is saline, i.e., that has some concentration of halide ion in it. For instance, in many swimming pools in Australia, where electrolytic purification of pool water is currently more popular than in the United States, a slight salinity level is achieved by dissolution of quantities of sodium chloride into the pool water. The water, with its dissolved halide ion, is passed through an electrolytic cell. The halide ions are oxidized by electrolysis to form hypohalic acid, hypohalite ions, or both (believed to occur through the intermediate of molecular halogen), which have known utility in disinfecting water (and whose use is typically known as "chlorinating" the water). In addition, the electrolysis reaction converts water into hydrogen and oxygen; some of the oxygen is converted further into ozone, which also has a disinfecting effect on the pool water.

Electrolytic purification is desirable because it is safe, effective, and for applications such as swimming pools, hot tubs, spas, etc., it eliminates much of the need for the pool owner or operator to handle chemicals and monitor water chemistry. The salinity levels necessary to achieve effective chlorination levels are typically well below the organoleptic thresholds in humans, and the primary chemical required to be handled by the operator is a simple alkali metal halide salt. In addition, operation of the electrolytic cell is comparatively easy, and requires little attention beyond ensuring the proper current and voltage levels are set, and maintaining the correct salinity levels in the water.

One of the disadvantages associated with electrolytic purification is the cost of the electrolytic cell, as well as the cost of replacement electrodes, which can corrode, become fouled with scale and the like or otherwise become inactivated over time. These costs are primarily driven by the size of the electrodes, which are typically constructed from titanium coated with platinum or ruthenium. Electrodes having a surface area sufficient to generate adequate chlorine levels represent a significant portion of the cost of installing and maintaining an electrolytic purification system. In addition, electrolytic cell life is limited due to the current density through the cell over time.

One approach to minimizing these issues is to combine electrolytic purification with other purification techniques, as described in U.S. Pat. No. 6,761,827. However, many pools and spas continue to use electrolytic purification as the sole or primary purification technique. For these systems, eventually the electrode will corrode to the point where replacement is desirable and necessary. There remains a need in the art for an electrolytic purification system wherein the electrode cartridge is easily replaceable, where replacement will not compromise the water-tight, pressure resistant nature of the system, and where good electrical connections are obtained with the replacement cartridge.

SUMMARY OF THE INVENTION

The apparatus of this invention contains a replaceable electrode cartridge that has good, stable electrical connections, and is contained within a cylindrical pressure vessel having a cap and seal arrangement that allow easy replacement of the cartridge and easy re-establishment of water-tight, pressure resistant seals in the system. In a particular embodiment, the apparatus flow path permits easy visual determination of whether the device is operating effectively.

In one embodiment, the invention relates to an apparatus for electrolytic purification, comprising:

(a) a pressure vessel having at least one access opening, at least one fluid flow inlet, and at least one fluid flow outlet, wherein the fluid flow inlet and fluid flow outlet are in fluid communication with a chamber inside the pressure vessel;

(b) an removable electrode assembly, at least a portion of which is disposed within the chamber inside the pressure vessel, comprising:
  a plurality of substantially parallel spaced planar electrodes,
  an electrical coupling between the electrode plates and a voltage source, and
  a radially extending circumferential sealing plate substantially normal to the planes of the electrodes, disposed near the electrical coupling, adapted to prevent fluid flow from the chamber to the electrical coupling;

(c) a removable locking ring, comprising:
  a proximal portion adapted to removably attach to the access opening of the pressure vessel and retain the radially extending circumferential sealing plate of the electrode assembly against the pressure vessel access opening.

In another embodiment, the invention contains the features described above, and in addition contains a a removable end cap adapted to cover the distal portion of the locking ring.

The apparatus allows for the easy removal and replacement of electrode assemblies, with the formation of a water-tight seal upon reinstallation of a new electrode assembly. In addition, the apparatus allows manufacturers to increase the safety and efficiency of their water purification device by ensuring that the proper electrode is inserted in the correct orientation during replacement.

BRIEF DESCRIPTION OF DRAWINGS

FIG. 4 is a side plan view, side sectional view, top plan view, bottom plan view, and perspective views of a cap of the apparatus of FIG. 1.

FIG. 5 is a side plan view, side sectional view, top plan view, bottom plan view, and perspective views of an electrode retention ring of the apparatus of FIG. 1.

DETAILED DESCRIPTION OF SPECIFIC EMBODIMENTS

The apparatus described herein can be used to sanitize and protect water from the growth of microorganisms, such as bacteria, virii, fungi, algae, and the like. This sanitizing and protecting effect can be used for water in a variety of applications, including swimming pools, hot tubs, spas, as well as wastewater treatment facilities, cooling towers, and the like. The description below will focus on applications for swimming pools, hot tubs, spas, and the like. Those familiar with the art of water purification will be able to modify the teachings below to other water treatment applications without the exercise of undue experimentation.

In many cases, the halide ion dissolved in the water will be chloride ion, with the result that the halogen gas formed is molecular chlorine, and the hypohalic acid formed by electrolysis will be hypochlorous acid, HOCl. It will be understood, however, that other halide ions and/or acids, such as bromide, iodide, hypobromous acid, or combinations thereof, can be present in the water and oxidized by electrolysis to form similar acids and which can dissociate to the corresponding oxidized ions, which may also have a sanitizing effect.

In general, sanitization of a body of water can be accomplished by removing a flow stream from the water, passing this flow stream through the electrolytic cell, and returning the treated flow stream to the body of water. Over time, and with a discrete body of water, hypohalic acid will have been carried by the pump and dispersed throughout the body of water, where it remains active in sanitizing the water.

The electrodes used in the electrolytic cell may be of any suitable material. However, the electrodes are generally not sacrificial electrodes made of copper, silver, zinc, or any metal species that it is desired to dissolve in the water, or any alloy thereof. One suitable electrode material is titanium, which may be coated to reduce corrosion and fouling, e.g. with a precious or semi-precious metal, such as platinum, ruthenium, or iridium.

The invention will be described in more detail with respect to the drawings, which are intended to provide illustration and exemplification only, and are not intended to limit the scope of the claims.

Figure 1:
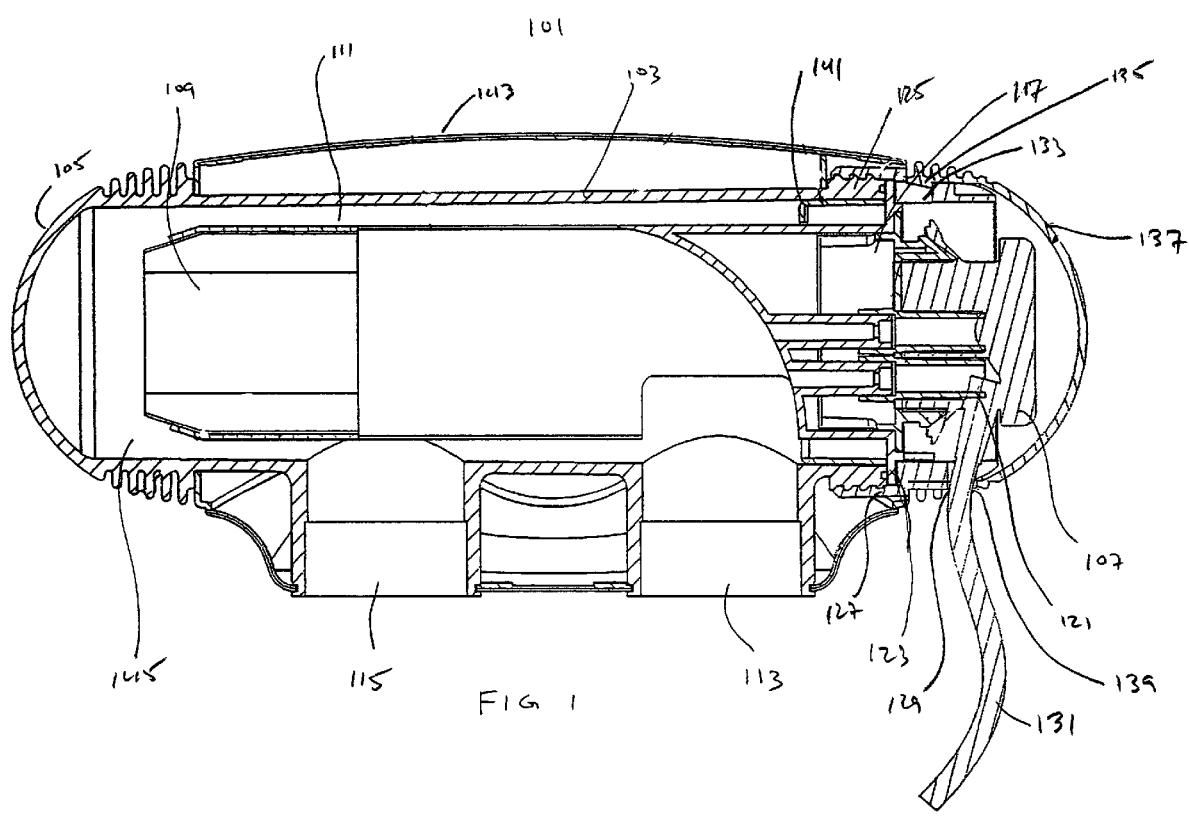
FIG. 1 is a side sectional view of one embodiment of an apparatus of the invention.

FIG. 1 is a longitudinal sectional view of one embodiment of the apparatus 101 of the invention. Pressure vessel 103 is essentially cylindrical, with an integral hemispherical end cap 105. Electrode assembly 107 is disposed within the pressure vessel such that substantially parallel spaced planar electrode plates 109 extend within chamber 111. Inlet opening 113 directs water into chamber 111 in the vicinity of the portion of electrode assembly 107 proximal to access opening 117 defined by the end of cylindrical pressure vessel 103. Outlet opening 115 directs water out of chamber 111 and is located distally of inlet opening 113 with respect to access opening 117.

Electrode assembly 107 also comprises an electrical coupling 121 between the electrode plates 109 and a voltage source (not shown), and a radially extending circumferential sealing plate 123 that abuts the edge of access opening 117. The electrode plates 109 extend into the chamber 111 of the pressure vessel 103, while the electrical coupling 121 extends through the opening defined by locking ring 127, and is separated from the chamber 111 by sealing plate 123.

Access opening 117 is contains external threads 125 which are engaged by the threads of the proximal portion of locking ring 127. The distal portion of locking ring 127 extends away from the pressure vessel, and contains an opening 129 adapted to receive cable 131 of electrode assembly 107. The distal portion of locking ring 127 also contains indent 133 adapted to engage detent 135 of removable cap 137. Cap 137 also contains an opening 139 adapted to receive cable 131 of electrode assembly 107, and to seal against this cable in cooperation with opening 129. The detent/indent combination serves to hold cap 137 against locking ring 127, thereby covering access opening 117.

Electrode retention ring 141 serves to help position the electrode assembly 107 in the chamber 111, so that water flow is properly directed over the electrode plates from the inlet opening. It also prevents electrode assemblies of the incorrect type from being inserted into the device. Those skilled in the art will recognize that this ring may be unnecessary if the electrodes are positioned properly by some other means, e.g., by means that are structural to the apparatus, or by a skilled installer.

For aesthetic or protective reasons, the pressure vessel 103 may be encased in a shroud 143.

The pressure vessel 103 (and thus chamber 111) may optionally extend longitudinally past outlet opening 115. If pressure vessel 103 is made from a transparent material, this extension 145 allows one to determine whether the device is operating by visual inspection. During operation, small hydrogen bubbles will be formed as a result of the electrolytic reaction in the chamber. These bubbles will detach from the electrode plates and be carried by water flow into the extension 145, where they can be observed visually before exiting the apparatus through outlet opening 115.

Figure 2:
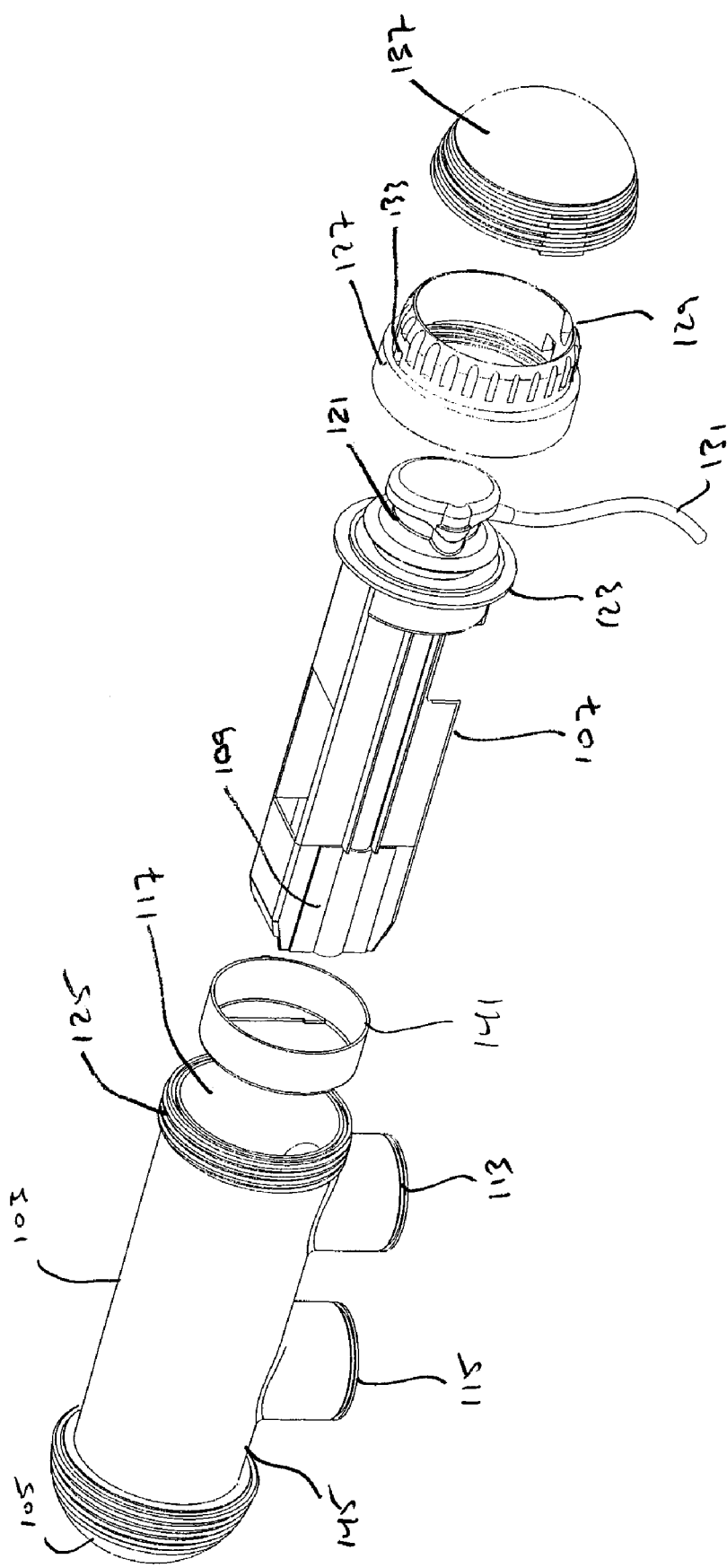
FIG. 2 is an exploded view of the apparatus of FIG. 1.

FIG. 2 shows many of the features described above in an exploded perspective view.

Figure 3:
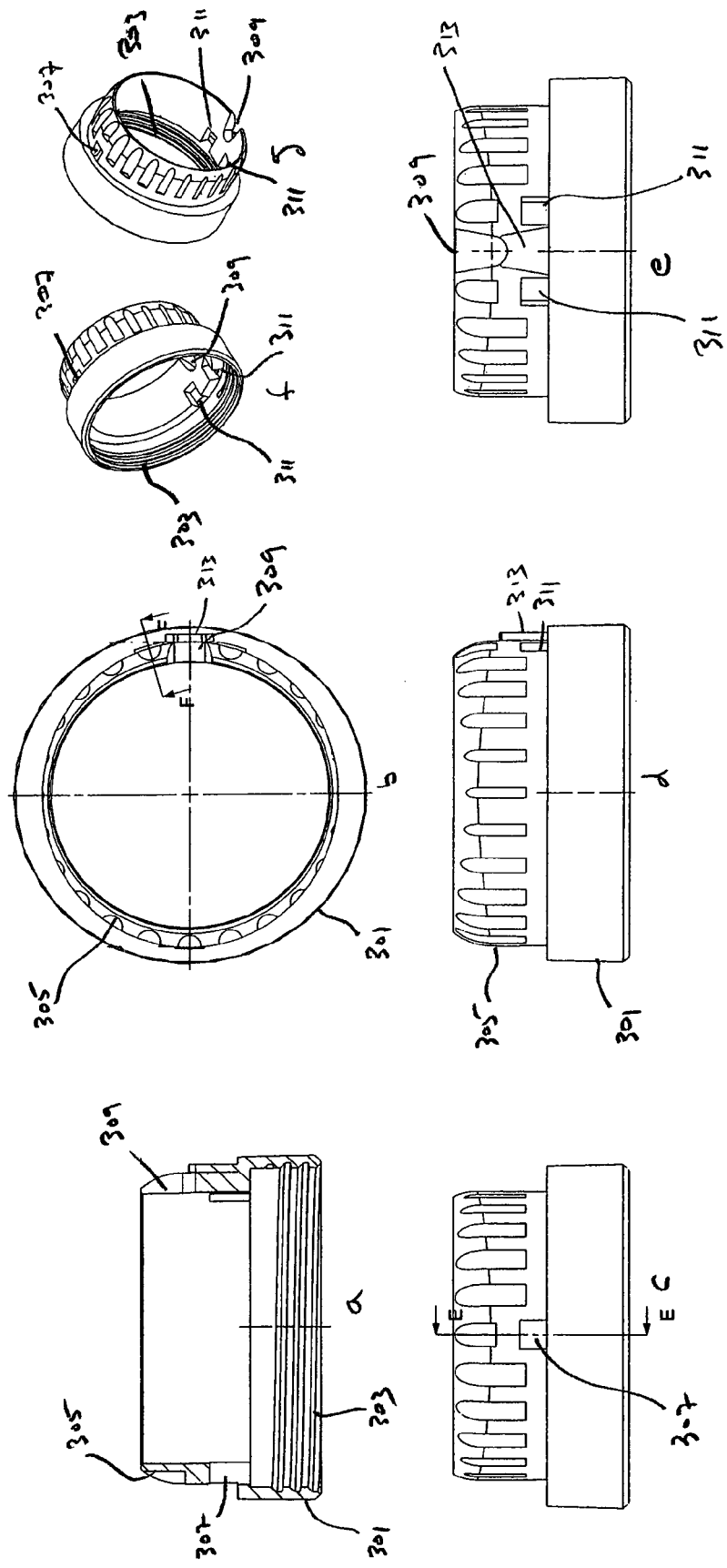
FIG. 3 is a side plan view, side sectional view, top plan view, bottom plan view, and perspective views of a locking ring of the apparatus of FIG. 1.

FIG. 3 shows an embodiment of locking ring 127 in various views. FIG. 3a is a side sectional view showing proximal portion 301, having internal threads 303 adapted to cooperate with external threads 125 of pressure vessel 103 near access opening 117. Opening 309 corresponds to opening 129 in FIG. 1 and seals against the electrode cable. Indent 307 corresponds to indent 133 in FIG. 1, and provides a mechanical lock with cap 137. FIG. 3b is a top plan view of the locking ring, showing lug 313 disposed below opening 309. Lug 313 is not visible in FIG. 1, but provides additional mechanical locking with cap 137. FIG. 3c is a rear plan view, showing indent 307. FIG. 3d is a side plan view, showing lug 313 and additional indent 311, which provides further mechanical locking with cap 137. FIG. 3e is a front plan view, showing opening 309, additional indents 311, and lug 313. FIGS. 3f and 3g are front and rear perspective views, respectively, showing additional indents 311, opening 309, indent 307, and threads 303. Those of skill in the art will recognize that additional indents and/or lugs may be included if deemed necessary or desirable, and that the location of indents, lugs, and openings may be varied without departing from the spirit of the invention.

FIG. 4 shows an embodiment of a cap used in the embodiment of the apparatus of the invention shown in FIG. 1. FIG. 4a is a front sectional view, showing opening 401, which corresponds to opening 139 in FIG. 1. While opening 401 is adapted to retain and seal against cable 131 of electrode assembly 107, it also receives lug 313 of locking ring 127, and provides a friction lock therewith. Lugs 403 cooperate with indents 311 in locking ring 127, as shown in FIG. 3 to provide additional mechanical locking. FIG. 4b is a top sectional view that also shows opening 401 and lugs 403, as well as lug 405, which cooperates with indent 307 of locking ring 127 to form a mechanical lock. Lug 405 can also be seen in side sectional view FIG. 4c, as can one of lugs 403. Opening 401 and lugs 403 can also be seen in FIG. 4d, which provides a bottom perspective view of the cap.

Although illustrated here as separate pieces, it will be understood by those of skill in the art that the locking ring and cap can be integrally formed into a single piece, eliminating the need for the various indents, lugs, and detents that mechanically lock the pieces together. This will, however, complicate introduction of the electrode assembly, as the entire assembly will need to be rotated as the locking ring is screwed onto the pressure vessel, and will complicate fitting the cable to the replacement electrode.

FIG. 5 shows various views of one embodiment of optional electrode retention ring 141. FIG. 5a is a top plan view, showing side portion 505 and back portion 503, in which opening 501 allows for insertion of electrode assembly 107. Opening 501 may contain indents or cut-outs 509 conforming it to the cross sectional shape of electrode assembly 107. These shapes may be modified so as to ensure that only the proper voltage and type of electrode (manufactured to have a particular cross section) can be inserted into the apparatus, and to ensure that the electrode is inserted with the proper orientation with respect to water flow into and out of the apparatus. FIG. 5b is a side sectional view of the retention ring shown in FIG. 5a. FIG. 5c is a top perspective view of the retention ring shown in FIG. 5a, and shows orientation lug 507, which allows the retention ring to be properly oriented within the pressure vessel.

In order to change out electrode assemblies and/or perform other routine maintenance on the apparatus, one need merely de-energize the device, depressurize the apparatus (turn off water flow and allow the device to drain), remove cap 137, unscrew locking ring 127, and remove electrode assembly 107 from the apparatus. A new electrode assembly is then inserted, and locking ring 127 and cap 137 replaced. The device can then be repressurized and reenergized. Because of the arrangement of the various elements described above, the device will have a water-tight seal after maintenance/replacement.

What is claimed is:

1. An apparatus for electrolytic purification, comprising:
   (a) a pressure vessel having at least one access opening, at least one fluid flow inlet, and at least one fluid flow outlet, wherein the fluid flow inlet and fluid flow outlet are in fluid communication with a chamber inside the pressure vessel;
   (b) an removable electrode assembly, at least a portion of which is disposed within the chamber inside the pressure vessel, comprising:
      a plurality of substantially parallel spaced planar electrodes,
      an electrical coupling between the electrode plates and a voltage source, and
      a radially extending circumferential sealing plate substantially normal to the planes of the electrodes, disposed near the electrical coupling, adapted to prevent fluid flow from the chamber to the electrical coupling;
   (c) a removable locking ring, comprising:
      a proximal portion adapted to removably attach to the access opening of the pressure vessel and retain the radially extending circumferential sealing plate of the electrode assembly against the pressure vessel access opening, thereby providing a seal thereto.

2. The apparatus of claim 1, wherein the pressure vessel comprises a transparent material.

3. The apparatus of claim 1, wherein the pressure vessel is substantially cylindrical.

4. The apparatus of claim 1, further comprising an electrode retention ring disposed between the electrode assembly and the access opening, and adapted to orient the electrode assembly within the chamber and to provide a sealing surface for the radially extending circumferential sealing plate of the electrode assembly.

5. The apparatus of claim 1, wherein the fluid flow inlet is proximal to the access opening and the fluid flow outlet is distal to the access opening.

6. The apparatus of claim 5, wherein the pressure vessel further comprises a chamber extension located distally of the fluid flow outlet from the access opening.

7. The apparatus of claim 6, wherein the chamber extension is transparent.

8. The apparatus of claim 1, wherein the pressure vessel is threaded near the access opening, and wherein the proximal portion of the locking ring is correspondingly threaded, so as to removably attach to the pressure vessel at the access opening.

9. The apparatus of claim 1, wherein the locking ring further comprises:
   a distal portion adapted to extend away from the pressure vessel.

10. The apparatus of claim 9, wherein the distal portion of the locking ring comprises an opening adapted to receive a cable connected to the electrode assembly.

11. The apparatus of claim 10, further comprising:
    (d) a removable end cap adapted to cover the distal portion of the locking ring. comprising an opening adapted to receive a cable connected to the electrode assembly and to cooperate with the opening in the distal portion of the locking ring to retain the cable and provide a seal thereto.

12. The apparatus of claim 9, further comprising:
    (d) a removable end cap adapted to cover the distal portion of the locking ring.

13. The apparatus of claim 12, wherein the locking ring and cap are integrated into a single piece.

14. The apparatus of claim 12, wherein the locking ring and cap are separate pieces that mechanically lock together.

15. The apparatus of claim 14, wherein the locking ring further comprises at least one radially extending lug or at least one radially extending indent, or both.

16. The apparatus of claim 12, wherein the cap further comprises at least one radially extending indent or at least one radially extending lug, or both, adapted to respectively receive the radially extending lug or radially extending indent of the locking ring.

* * * * *